Patented Dec. 23, 1930

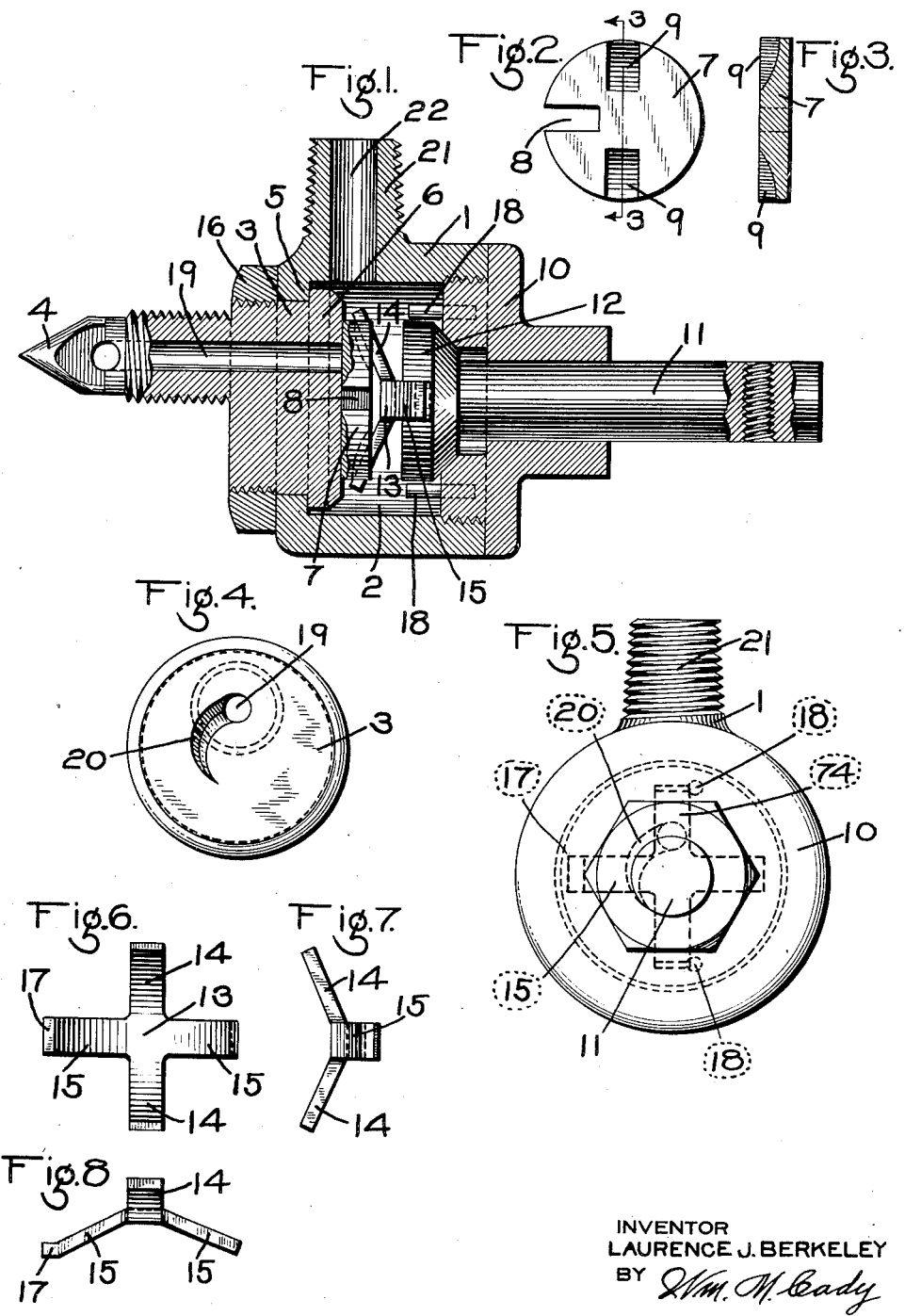

1,786,330

UNITED STATES PATENT OFFICE

LAURENCE J. BERKELEY, OF CLEVELAND, OHIO, ASSIGNOR TO W. M. JENKINS, TRUSTEE, OF PITTSBURGH, PENNSYLVANIA

VALVE DEVICE

Application filed August 10, 1929. Serial No. 385,013.

This invention relates to valve devices, more particularly of the throttle regulating type and wherein a needle valve is employed to regulate the flow of gas.

With this type of valve, it is usual to regulate the flow area by means of an annular opening of restricted width. Such an opening is liable to become clogged and it is difficult to regulate the size of the opening with the desired nicety.

One object of my invention is to provide a throttle valve device in which the flow area may be regulated but is always maintained as a substantially rectangular opening in any position of adjustment.

Another object of my invention is to provide a throttle valve device in which means are interposed between the regulating valve and the operating stem which not only serves as a universal joint to allow for irregularities in alinement of the valve and stem, but also acts as a spring to hold the valve to its seat.

Other objects and advantages will appear in the following more detailed description of the invention.

In the accompanying drawing; Fig. 1 is a central sectional view of a throttle valve device embodying my invention; Fig. 2 a plan view of the regulating valve disk; Fig. 3 a section on the line 3—3 of Fig. 2; Fig. 4 a plan view of the valve seat member; Fig. 5 an end view of the valve device shown in Fig. 1; Fig. 6 a plan view of the universal joint member; Fig. 7 a side view of the universal joint member looking in one direction; and Fig. 8 another side view of the universal joint member, looking in another direction.

As shown, the valve device may comprise a hollow body member 1, in the chamber 2 of which is mounted a valve seat member 3 having associated therewith the usual needle valve 4. The member 1 is provided at one side with an annular shoulder 5 and the seat member 3 is provided with an annular enlargement 6 adapted to engage the shoulder 5.

After the member 3 has been inserted in the chamber 2 through the right hand opening of the member 1, with the portion 6 engaging the shoulder 5, a nut 16 is applied to screw threads provided on the member 3 and is screwed tight to hold the member 3 in place.

A disk valve 7 engages the seat member 3 and is provided with a radially extending rectangular through opening 8. Said valve is also provided with opposite recesses 9. Screw threads are provided at the interior of the member 1 at the right hand end and a cover plate 10 is screwed into same. Said plate is provided with a central bore to receive a valve operating stem 11, having at its inner end a conical valve like enlargement 12 which is adapted to engage a corresponding conical seat provided in the plate 10, so as to prevent leakage from chamber 2.

A universal joint member 13 is provided which is made in the form of a cross, having two of its arms 14 bent in one direction and the other two of its arms 15 bent in the opposite direction, as shown in Fig. 7 and 8. The ends of the arms 14 engage in the recesses 9 of the disk valve 7 and the ends of the arms 15 engage in corresponding recesses formed in the portion 12. The universal joint member 13 is made of spring material, so that when the parts are assembled together, the member 13 acts as a spring to hold the valve disk 7 to its seat and at the same time, the member 13 acts to provide a universal joint between the valve disk 7 and the operating stem 11, so as to allow for any irregularities in alinement of the parts.

One of the arms 15 of the universal joint member 13 is provided with an extension 17 which is adapted to engage stop pins 18 arranged at diametrically opposite points and secured in the cover plate 10, so as to limit the rotative movement of the stem 11 and consequently the valve disk 7.

The seat member 3 is provided with a bore 19 which leads from the valve seat to the needle valve 4 and extending from said bore is a curved cavity 20 formed in the valve seat. Said cavity narrows in width from the full diameter of the bore 19 to no width at the extreme outer end of the cavity.

The slot 8 in the valve disk 7 registers with the cavity 20 as the valve disk is rotated and a flow area is provided which is always substantially rectangular in cross section, but varies in width as the valved disk is turned from its full area position. The member 1 is provided with a nipple extension 21 having an aperture 22 which communicates with the chamber 2, so that fluid or gas may be supplied to said chamber through the bore 22.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. A throttle valve device comprising a valve seat member having a cavity in its seat of varying width and a valve mounted on said seat and provided with a radial port adapted to register with said cavity.

2. A throttle valve device comprising a valve seat member having a cavity in its seat of varying width and curved about the axis of said seat and a valve mounted on said seat and having a radially extending parallel sided port adapted to register with said cavity.

3. A throttle valve device comprising a valve seat member having a cavity in its seat of varying width, the bounding edges of said cavity being curved about the axis of said seat, and a valve mounted on said seat and having a rectangular, radially extending opening adapted to register with said cavity.

4. A throttle valve device comprising a valve, a stem for operating said valve, and a resilient member operatively connecting said valve to said stem and having fingers engaging in recesses provided in said valve and said stem.

5. A throttle valve device comprising a valve, a stem for operating said valve, and a resilient member operatively connecting said valve with said stem and having arms forming a cross, one pair of arms engaging in recesses in said valve and the other pair of arms engaging in recesses formed in said stem.

6. A throttle valve device comprising a valve, a stem for operating said valve, and a resilient member operatively connecting said valve with said stem and adapted to yieldingly press said valve to its seat and having fingers arranged in the form of a cross with a pair of opposite fingers engaging in recesses in said valve and the other pair of fingers engaging in recesses in said stem.

7. A throttle valve device comprising a valve, a stem for operating said valve, and a resilient member operatively connecting said valve with said stem and adapted to yieldingly press said valve to its seat and having fingers arranged in the form of a cross with one pair of opposite fingers bent in one direction and engaging in recesses in said valve, and the other pair of fingers bent in the opposite direction and engaging in recesses in said stem.

8. A throttle valve device comprising a hollow casing, a valve mounted in said casing, a stem mounted in said casing, a member operatively connecting said valve with said stem having fingers arranged in the form of a cross, with one pair of opposite fingers engaging in grooves in said valve and the other pair of fingers engaging in grooves in said stem, a stop pin mounted in said casing, and a tang carried by one of said fingers for engaging said pin.

In testimony whereof I have hereunto set my hand, this 7th day of August, 1929.

LAURENCE J. BERKELEY.